United States Patent
Markel (10) Patent No.: US 6,444,773 B1
(45) Date of Patent: Sep. 3, 2002

(54) PREPARATION OF VINYL-CONTAINING MACROMERS

(75) Inventor: Eric J. Markel, Kingwood, TX (US)

(73) Assignee: ExxonMobile Chemical Patents Inc., Houston, TX (US)

( * ) Notice: Subject to any disclaimer, the term of this patent is extended or adjusted under 35 U.S.C. 154(b) by 0 days.

(21) Appl. No.: 09/521,043

(22) Filed: Mar. 8, 2000

Related U.S. Application Data (63) Continuation of application No. 09/020,138, filed on Feb. 6, 1998, now abandoned.
(60) Provisional application No. 60/037,323, filed on Feb. 7, 1997.

(51) Int. Cl.$^7$ ............................................. C08F 210/16
(52) U.S. Cl. ......................... 526/348; 526/352; 585/12
(58) Field of Search ................... 526/352, 348; 585/12

(56) References Cited

U.S. PATENT DOCUMENTS

| | | |
|---|---|---|
| 4,752,597 A | 6/1988 | Turner |
| 4,923,833 A | 5/1990 | Kioka et al. |
| 5,324,800 A | 6/1994 | Welborn, Jr. et al. |
| 5,444,145 A | 8/1995 | Brant |
| 5,475,075 A | 12/1995 | Brant |
| 5,955,557 A * | 9/1999 | Machida et al. ............ 526/346 |

FOREIGN PATENT DOCUMENTS

| | | |
|---|---|---|
| EP | 0 129 368 A1 | 12/1984 |
| EP | 0 690 079 A | 1/1996 |
| WO | WO 87/03604 A | 6/1987 |
| WO | WO 94/07930 | 4/1994 |
| WO | WO 95/11931 | 5/1995 |
| WO | WO 97/06201 | 2/1997 |

OTHER PUBLICATIONS

"Olefin Polymerization at Bis(pentamethylcyclopentadienyl)zirconium and –hafnium Centers: Chain–Transer Mechanisms," *J. Am. Chem. Soc.*, vol. 114, Resconi, et al, pp. 1025–1032 (1992).

* cited by examiner

*Primary Examiner*—David W. Wu
*Assistant Examiner*—Caixia Lee
(74) *Attorney, Agent, or Firm*—William G. Muller; Charles E. Runyan (57) ABSTRACT

A composition of matter comprising vinyl ended copolymer chains having a number average molecular weight ($M_n$) of about 1500 to 75,000, the number average molecular weight being determined by gel permeation chromatography (GPC) at 145° C., a ratio of vinyl groups to total olefin groups according to the formula $$\frac{\text{vinyl groups}}{\text{olefin groups}} \geq (\text{comonomer mole percent} + 0.1)^a \times 10^a \times b \quad (1)$$

where a and b have the following sets of valuer: when a=−0.24, b=0.8; when a=−0.20, b=0.8; when a=−0.18, b=0.83; when a=−0.15, b=0.83; and when a=−0.10, b=0.85; and where the total number of vinyl groups per 1000 carbon atoms is in the range from greater than 0.13 to less than 9.85, the vinyl group measurement being taken by GPC (145° C.) and $^1$H-NMR (125° C.).

18 Claims, 1 Drawing Sheet

Figure 1

PREPARATION OF VINYL-CONTAINING MACROMERS

This application is a continuation of application Ser. No. 09/020,138, filed Feb. 6, 1998 now abandoned, and claims the benefit under 35 U.S.C. 119(e) of provisional application, Ser. No. 60/037,323, filed Feb. 7, 1997.

FIELD OF THE INVENTION

The present invention relates to a method for the preparation of vinyl-containing macromers from olefins utilizing transition metal catalyst compounds with alumoxane co-catalyst activators.

BACKGROUND OF THE INVENTION

Vinyl-terminated polymers, including for the purposes of this application oligomers, homopolymers and copolymers synthesized from two or more monomers, are known to be useful for post-polymerization (or post-oligomerization) reactions due to the available ethylenic unsaturation at one polymer one chain end or both. Such reactions include addition reactions, such as those used in grafting other ethylenically unsaturated moieties, and further insertion polymerization where the vinyl-terminated polymers are copolymerized with other monomers such as α-olefins and/or other insertion polymerizable monomers. In this latter instance the vinyl-terminated polymers are often called macromonomers, or macromers.

Early work with metallocene transition metal catalyst compounds activated with alkylalumoxanes such as methylalumoxane led to observations that their use in olefin polymerization gave rise to unsaturated end-groups in a greater percentage of polymer produced than had typically been true of insertion polymerization using traditional, pre-metallocene Ziegler-Natta catalysts. See EP-A-0 129 638 and its U.S. patent equivalent U.S. Pat. No. 5,324,800. Later work by Resconi, et al, reported in Olefin Polymerization at Bis(pentamethylcyclopentadienyl)zirconium and -hafnium centers: Chain-Transfer Mechanisms, *J Am. Chem. Soc.*, 1992, 114, 1025–1032, yielded the observations that the use of bis(pentamethylcyclopentadienyl) zirconcene or hafnocene in propylene oligomerization favors β-methyl elimination over the more commonly expected β-hydride elimination as the means for chain transfer, or polymer chain termination. This was based on observations that the ratio of vinyl-end groups to vinylidene-end groups was in the range of 92 to 8 for the zirconocene and 98 to 2 for the hafnocene.

In addition to these observations, WO 94/07930 addresses advantages of including long chain branches in polyethylene from incorporating vinyl-terminated macromers into polyethylene chains where the macromers have critical molecular weights greater than 3,800, or, in other words contain 250 or more carbon atoms. Conditions said to favor the formation of vinyl terminated polymers are high temperatures, no comonomer, no transfer agents, and a non-solution process or a dispersion using an alkane diluent. Increase of temperature during polymerization is also said to yield β-hydride eliminated product, for example while adding ethylene so as to form an ethylene "end cap". This document goes on to describe a large class of both mono-cyclopentadienyl and bis-cyclopentadienyl metallocenes as suitable in accordance with the invention when activated by either alumoxanes or ionizing compounds providing stabilizing, noncoordinating anions. The examples all illustrate the use of the Lewis acid activator tris(perfluorophenyl) boron with bis(cyclopentadienyl) zirconium dimethyl at a polymerization temperature of 90° C. Copolymerization was conducted with ethylene and the two macromers, respectively, using the same catalyst systems as used to form the macromers.

Branched ethylene macromers are described in WO 95/11931. According to this disclosure vinyl groups are to be greater than 75 mol. %, more preferably greater than 80 mol. %, of the total unsaturated groups, and the weight average molecular weight is said to be in the range of 100 to 20,000. The method of manufacture of the described macromers is said to be with a transition metal compound containing metals of groups 3 through 10, cyclopentadienyl derivatives of group 4, 5, and 6 are-said to be of satisfactory utility in this regard. These transition metal compounds are also said to capable of forming ionic complexes suitable for polymerization by reacting with ionic compounds, alumoxane or Lewis acids. The ratio of the transition metal component to the alumoxane component is said to be desirable when at 1/10 to 1/10,000, or most preferably 1/30 to 1/2000. Examples 1 and 7 illustrate ethylene macromer preparation with ratios of alumoxane compound to transition metal compound of 240 and 2000, respectively.

Various patents address the use of metallocene catalysts with varying levels of activating alumoxane cocatalysts. One such is U.S. Pat. No. 4,752,597 where relatively hydrocarbon-insoluble solid reaction products of metallocenes and alumoxane are prepared by reacting the two in a suitable solvent where aluminum metal to transition metal molar ratios are between 12:1 to 100:1. The solid reaction product is then removed. This solid reaction product is said to be useful for gas phase, slurry and solution polymerization.

Additional art addresses the preparation of chain-end unsaturated polymers with various metallocenes under various conditions, each of vinyl-, vinylidene-, vinylene- and trisubstituted-unsaturation resulting from the reported processes. The difficulty in determining by standard characterization methods ($^1$H-NMR or $^{13}$C-NMR) the total of saturated chain ends has resulted in acceptance in the art of characterizing unsaturated end-group by the fraction of the total of each type of unsaturation to the total unsaturated ends. However, industrially efficient methods of production would greatly benefit from high unsaturated end group concentrations to the total end group population that is including the saturated ends. Thus, the reported variations in molecular weight distributions and the inability to accurately determine or predict the resulting type of chain ends, or the less favored production of unsaturated chain-ends other than those of vinyl, limits the utility of the prior art. Vinyl-chain ends are generally accepted to be more reactive to chain-end functionalization and insertion in subsequent polymerization reactions than are the other types and are more highly preferred. Accordingly additional work was undertaken to improve the vinyl-chain terminated polymer preparation process, its predictability and its utility for use in the preparation of branched polymers.

SUMMARY OF THE INVENTION

The invention comprises an olefin polymerization reaction product having olefin unsaturation that is predominantly vinyl. In these reaction product compositions the molar concentration of vinyl groups is greater than or equal to 50% of the total polymer chain molar concentration. More specifically, as calculated from gel permeation chromatography (GPC) and differential refractive index (DRI) measurements, the invention is a polymeric reaction product composition of matter comprising olefin polymer chains having number-average molecular weights ("$M_n$") from about 400 to about 75,000, a ratio of vinyl groups to total olefin groups satisfying the formula $$\frac{\text{vinyl groups}}{\text{olefin groups}} \geq [\text{comonomer mole percent} + 0.1]^a \times 10^a \times b \quad (1)$$

where, a=−0.24, and b=0.8
and, where the total number of vinyl groups per 1000 carbon atoms is greater than or equal to $8000 \div M_n$. It also includes a surprisingly, highly efficient method for preparing polymers having high levels of vinyl unsaturation comprising contacting one or more olefin monomers with a catalyst solution composition containing a transition metal catalyst compound and an alumoxane wherein the aluminum to transition metal ratio is from 10:1 to 220:1. Vinyl-containing chain yields at levels of greater than 70% of the total unsaturated chains can be achieved while simultaneously achieving high yields of unsaturated chains in the total polymer chains as calculated from GPC and NMR. Thus, use of the process conditions of the invention permits predictable macromer characteristics of both molecular weight and the vinyl unsaturation which further enable the preparation of branched polymers having tailored characteristics suitable for improved processing applications, for example where melt processing is either required or industrially preferred, and in polymer blends where the choice of macromer monomer or comonomer constituents can lead to improved compatibilities or other characteristics of the polymer blend.

DETAILED DESCRIPTION OF THE INVENTION

Figure 1:
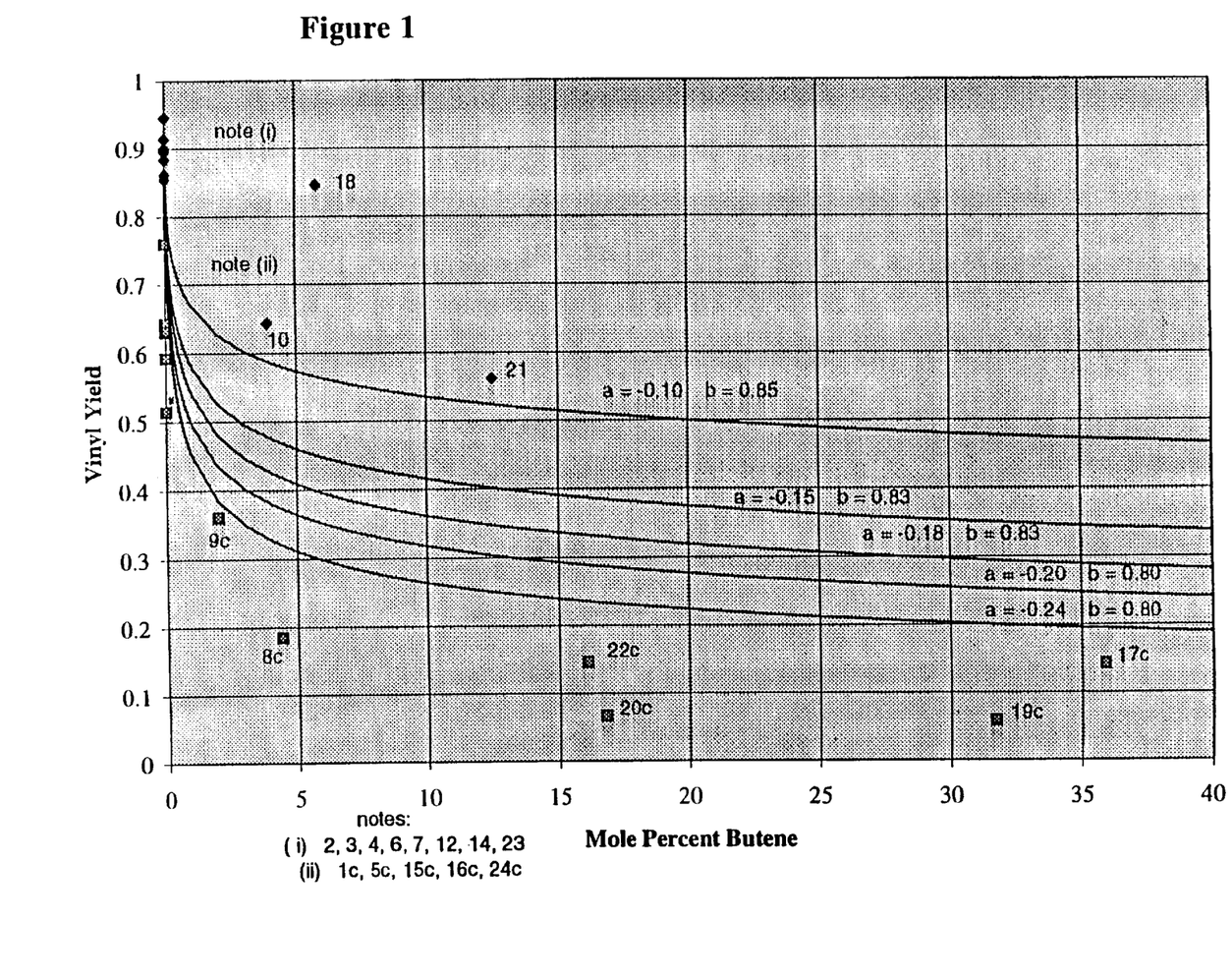
FIG. 1 illustrates the examples 1–24 of the application in showing the vinyl yields as a percentage of total olefinic groups in the polymer products and their relationship in a accordance with formula (1), below. The vinyl groups were characterized in accordance with $^1$H(NMR) methods as described in the application.

The polymeric macromer compositions of matter according to the invention are the polymeric chain reaction products of insertion or coordination polymerization of olefinic monomers. Means of achieving high proportions of vinyl containing chains relative to the total number of unsaturated chains in the polymerization reaction products were effectively achieved. levels reached greater than 80% vinyl containing chains, and even greater than 90%. The highest levels, above 90% or even 95%, were achieved with ethylene homopolymers. For copolymers the vinyl chain levels were dependent upon the ratio of ethylene to comonomer as defined in equation (1). The polymeric compositions or reaction products contain chains- with narrow polydispersities, from 1.5 to about 6, typically 2 to 4, or even 2 to 3.5.

The number-average molecular weight ($M_n$) of the invention polymeric macromers typically range from greater than or equal to 400 Daltons to less than 80,000 Daltons, more preferably less than 60,000 Daltons, most preferably less than or equal to 50,000 Daltons.

In the formula (1) above the values of a and b are within the preferred ranges expressed in Table A.

TABLE A

| a | b |
|---|---|
| −0.20 | 0.8 |
| −0.18 | 0.83 |
| −0.15 | 0.83 |
| −0.10 | 0.85 |

The total number of vinyl groups per 1000 carbon atoms of the polymeric reaction product is typically greater than 0.13 and less than 9.85.

The polymeric compositions of matter thus described exhibit higher numbers of vinyl containing chains for the total polymeric reaction product, including both polymer chains having saturated groups and those with unsaturated groups. Accordingly, these polymer products can be effectively used for subsequent reactions where reactive vinyl groups are needed. A measure of this effectiveness of the invention polymeric products is illustrated by the observed reaction efficiencies, that is yield of sought reaction products of functionalized reactions or macromer copolymerization reactions. The greater the overall vinyl group content, the greater is the yield of functionalized polymer or the yield of macromer-branch containing copolymers.

A broad range of the invention polymeric reaction products containing vinyl macromers, including homopolymers, copolymers and polymers containing three or more monomer types, can be synthesized using the catalyst compositions of the present invention. Thus, the monomers polymerized using these catalysts include, but are not limited to: ethylene, $C_3$–$C_{18}$ α-olefins, isobutylene; cyclic olefins, e.g., norbornene, methyl-norbornene, cyclopentene; styrene, non-conjugated dienes and cyclic dienes. As suggested by this list, any comonomer copolymerizable with ethylene by coordination or insertion polymerization will be suitable in accordance with the invention. Such further include: internal olefins, such as 1-butene; substituted olefins, such as 3-methyl-1-pentene; multiply substituted olefins, such as 3,3-dimethyl-1-hexene and aromatic olefins. The assembly of monomers in the polymeric reaction products is not limited only to random copolymers or mixtures of random copolymers. It is known in the art that the sequence of monomer and comonomers in the chains can be controlled to impart useful properties by use of various means, for example, fluxional catalysts or sequential polymerization processes.

The method for preparing the polymeric vinyl-containing macromer product of the invention involves contacting one or more olefin monomers with a catalyst solution composition containing a transition metal catalyst compound and an alumoxane at preferred aluminum to transition metal ratios. The catalyst solution preparation typically comprises contacting the alumoxane activator with the transition metal compound in a suitable solvent so as to form a solution of activated catalyst. Toluene is a preferred solvent for the catalyst solution in view of the high solubility of alumoxane and many the transition metal compounds that are suitable as catalysts when activated in it. Other solvents capable of solvating to a significant extent both of the activator and the transition metal compound, as can be readily determined empirically, will also be suitable. Both of aliphatic and aromatic solvents will be suitable so long as the transition metal compound and the alumoxane activator are substantially soluble at the mixing temperatures utilized.

The method of preparation for the polymeric vinyl-containing macromer product of the invention depends principally upon the molar ratio of aluminum in the alkyl alumoxane activator to transition metal. Preferably that level is $\geq 20$ and $\leq 175$; more preferably $\geq 20$ and $\leq 140$; and, most preferably $\geq 20$ and $\leq 100$. The temperature, pressure and time of reaction depend upon the selected process but are generally within the normal ranges for the selected process. Thus temperatures can range from 20° C. to 200° C., preferably from 30° C. to 150° C., more preferably from 50° C. to 140° C., and most preferably between 55° C. and 135° C. The pressures of the reaction generally can vary from atmospheric to $305 \times 10^3$ kPa, preferably to $182 \times 10^3$ kPa. For typical solution reactions, temperatures will typically range from ambient to 250° C. with pressures from ambient to 3450 kPa. The reactions can be run batchwise. Conditions for slurry-type reactions are similar to solution conditions except reaction temperatures are limited to the melt temperature of the polymer. In some reaction configurations, a supercritical fluid medium can be used with temperatures up to 250° C. and pressures up to $345 \times 10^3$ kPa. Under high temperature reaction conditions, macromer product of lower molecular weight ranges are typically produced.

Batchwise reaction times can vary from 1 minute to 10 hours, more preferably 5 minutes to 6 hours, and most typically from 45 minutes to 90 minutes. The reactions can also be run continuously. In continuous processes the average residence times can similarly vary from 1 minute to 10 hours, more preferably 5 minutes to 6 hours, and most typically from 45 minutes to 90 minutes.

The transition metal catalysts suitable in the invention process for preparing the vinyl macromer- containing reaction products include one or more transition metal catalyst precursor compound that has both 1) stabilizing ancillary ligands and 2) additional ligands which react with alumoxane activators such that an active transition metal catalyst complex is produced. Preferred compounds include metallocene compounds containing at least one ancillary substituted or unsubstituted cyclopentadienyl ("Cp") ring as ligands of the transition metal. Here substituted means that one or more of the hydrogen atoms bonded to the ring carbon atoms of one or both Cp rings is replaced with one or more monovalent radicals capable of sigma bonding with the ring carbon. Examples include $C_1$–$C_{30}$ hydrocarbyl radicals and their counterparts where one or more carbon atoms is replaced with another Group 14 atom, e.g., Si or Ge. The term "substituted" includes both 1) bridging or linking radicals that are bonded to two different Cp ligands or to one Cp ligand and another transition metal ligand such as a Group 15 or 16 heteroatom ligand, and 2) fused ring configurations wherein two Cp ring atoms are covalently linked by substituents as in indenyl and fluorenyl ligands, which may themselves be further substituted and/or bridged. Examples include those monocyclopentadienyl and biscyclopentadienyl Group 4–6 compounds known to those skilled in the art as being suitable for olefin polymerization. For biscyclopentadienyl compounds see, e.g., U.S. Pat. Nos. 5,324,800, 5,324,801, 5,441,920 and 5,502,124. For exemplary monocyclopentadienyl metallocene compounds see, e.g., U.S. Pat. Nos. 5,055,038, 5,264,505, and copending U.S. Ser. No. 08/545,973, filed Oct. 20, 1995, and U.S. Ser. No. 08/487,255 filed Jun. 7, 1995 and published as WO 96/00244.

Additionally included in the definition of metallocene for purposes of this invention are those cyclopentadienyl-analogs wherein one or more ring carbon atom is replaced with a Group 14 or 15 heteroatom, or in fused ring systems, such as indenyl and flourenyl, where one or more carbon atom in any of the fused rings is so replaced. Listing of suitable metallocenes include essentially any of those available in the patent literature, such as those listed above, and academic literature relating to olefin polymerization, including specifically those addressing amorphous, and semi-crystalline and crystalline homopolymers and copolymers of more than one monomer. In particular, those documents addressing polyethylene polymers and copolymers and those addressing stereoregular higher olefins, such as isotactic and syndiotactic polypropylene polymers and copolymers contain suitable descriptions.

Any of the other transition metal olefin polymerization catalyst precursor compounds particularly those of the Group 4, 5, 6, 7, 8, 9 and 10 metals, known in the art to be capable of activation with alumoxane are also suitable, see for example WO 96/23010, U.S. Pat. Nos. 5,504,049, 5,318, 935, and co-pending U.S. Ser. No. 08/473,693, filed Jun. 7, 1995, and U.S. Ser. No. 60/019626, filed Jun. 17, 1996. All of which are referred to and incorporated by reference for purposes of U.S. patent practice.

Reactor configurations suitable for the present invention include continuous, batch and semi-batch reactors. Solution-phase, slurry-phase, and supercritical-phase conditions are useful for olefin polymerization using these catalysts. Additionally, combinations of the above reactor types in multiple, series reactors and/or multiple reaction conditions and/or multiple catalyst configurations are explicitly intended.

Preferred solvents for solution phase reactions are selected on the basis of polymer solubility, volatility and safety/health considerations. Non-polar alkanes or aromatics are preferred. For supercritical fluid reactions, the reaction medium is generally composed of polymer. monomer. and comonomer with, optionally, suitable supercritical cosolvents. For slurry reactions the diluent may be an inert liquid or bulk liquid comonomer. Solvents, cosolvents and comonomers are typically purified by treatment with absorbent material including aluminas and molecular sieves. Impurities can also be deactivated by the addition of suitable scavengers well known in the art, including but not limited to metal alkyls and alumoxanes.

INDUSTRIAL UTILITY

Branched polymers wherein at least some of the branches are derived from the vinyl macromer-containing product of the invention will be particularly useful, for example, for improved processing ethylene copolymers having macromer derived branches. Vinyl macromer incorporation for branched polymer preparation can be accomplished by adding the invention polymer product into an insertion polymerization environment with a catalyst compound capable of bulky monomer incorporation. Such includes the bridged mono- and biscylopentadienyl metallocene catalyst compounds suitable for insertion polymerization of such bulky comonomers as 1-octadecene, 3-methyl-1-pentene and cyclic olefins, such as norbornene. See, for example, U.S. Pat. Nos. 5,324,801, 5,444,145, 5,475,075 and 5,635,573 and international application WO 96/000244. Other suitable catalyst systems include, but are not limited to, amido and imido derivatives of the Group 4, 5, 6, 7, 8, 9, and 10 metals described in the documents noted above for the vinyl macromer-containing polymeric products of the invention. Also, WO 94/07930, addressed in the background, describes the advantages of macromer incorporation and means of doing so. Each of these documents is also incorporated by reference for purposes of U.S. patent practice.

For both vinyl macromer product and branched copolymer preparation, it is known that many methods and permutations of the ordering of addition of macromer and monomer species to the reactor are possible, some more advantageous than others. For example, it is widely known in the art that preactivation of the metallocene with alumoxane before addition to a continuous solution-phase reactor yields higher activities than continuous addition of metallocene and activator in two separate streams. Furthermore, it may be advantageous to controlprecontacting time to maximize catalyst effectiveness, e.g., avoiding excessive aging of the activated catalyst composition.

Preferred branch copolymers of the invention are ethylene homopolymers and copolymers of ethylene with two or more comonomers. The most readily available comonomers are the olefins, especially propylene, 1-butene, isobutylene, 1-hexene, and 1-octene. Other suitable comonomers include but are not be limited to: internal olefins, cyclic olefins, substituted olefins, multiply substituted olefins and aromatic olefins, such as those described above for the vinyl macromer products. Comonomers are selected for use based on the desired properties of the polymer product and the metallocene employed will be selected for its ability to incorporate the desired amount of olefins. See U.S. Pat. No. 5,635,573 describing various metallocenes suitable for ethylene-norbornene copolymers and co-pending U.S. application Ser. No. 08/651,030, filed May 21, 1996, describing monocyclopentadienyl metallocenes suitable for ethylene-isobutylene copolymers. These documents are incorporated by reference for purposes of U.S. patent practice.

For improved polyethylene film tear, a longer olefin comonomer, such as 1-octene, may be preferred over a shorter olefin such as butene. For improved polyethylene film elasticity or barrier properties, a cyclic comonomer such as norbornene may be preferred over an olefin. The concentrations of comonomer in the reactor will be selected to give the desired level of comonomer in the polymer, most preferably from 0 to 50 mole percent.

Furthermore, it is possible to react two or more polymeric macromer chains having the same or different comonomers and/or the same or different molecular weights to derive new polymer compositions with desirable properties. We have found that statistical mixtures or formulated mixtures of the branch/block molecules derived by the joining of these macromer chains exhibit commercially useful properties. Optionally, it is possible to use dienes to control incorporation of unsaturated chains into other unsaturated chains.

Functionalization reactions for low molecular weight vinyl group-containing polymeric products include those based on thermal or free radical addition, or grafting, of vinyl-group containing compounds and ethylenically unsaturated compounds. A typical, industrially useful example is subsequent grafting reactions with maleic acid, maleic anhydride or vinyl acids or acid esters, e.g., acrylic acid, methyl acrylate, etc. The addition of these groups allows for additional functionalization through amidation, immidization, esterification and the like. For example, see, U.S. Pat. No. 5,498,809 and international publications WO 94/19436 and WO 94/13715. Each addresses ethylene-1-butene polymers having vinylidene termination and their functionalization into effective dispersants in lubricating oil compositions. See also EP 0 513 211 B1 where similar copolymers are described in effective wax crystal modifier compositions for fuel compositions. The invention polymeric products useful in this manner typically will have $M_n$ from about 1,500 to 10,000 $M_n$ preferably about 2,000 to 5,000 $M_n$. Each of these documents are incorporated by reference for purposes of U.S. patent practice.

It is preferable to use the high vinyl-unsaturation polymeric products of the invention such that they are promptly functionalized or copolymerized after prepared. The highly reactive vinyl groups appear to be susceptible to by-product reactions with adventitious impurities and,. even, dimerization or addition reactions with other unsaturated group-containing polymeric chains. Thus maintaining in a cooled, inert environment in dilute concentrations after preparation and prompt subsequent use will optimize the effectiveness of the use of vinyl macromer product of the invention. A continuous process utilizing series reactors. or parallel reactors will thus be effective. the vinyl macromer product being prepared in one and continuously introduced into the other.

EXAMPLES

General: All polymerizations were performed in a 1-liter Zipperclave reactor equipped with a water jacket for temperature control. Liquids were measured into the reactor using calibrated sight glasses. High purity (>99.5%) hexane, toluene and butene feeds were purified by passing first through basic alumina activated at high temperature in nitrogen, followed by 13×molecular sieve activated at high temperature in nitrogen. Polymerization grade ethylene was supplied directly in a nitrogen-jacketed line and used without further purification. Clear, 10% methylalumoxane (MAO) in toluene was received from Albemarle Inc. in stainless steel cylinders, divided into 1-liter glass containers, and stored in a laboratory glove-box at ambient temperature. Ethylene was added to the reactor as needed to maintain total system pressure at the reported levels (semi-batch operation). Ethylene flow rate was monitored using a Matheson mass flow meter (model number 8272–0424). To ensure the reaction medium was well-mixed, a flat-paddle stirrer rotating at 750 rpm was used.

Reactor preparation: The reactor was first cleaned by heating to 150° C. in toluene to dissolve any polymer residues, then cooled and drained. Next, the reactor was heated using jacket water at 110° C. and the reactor was purged with flowing nitrogen for a period of ~30 minutes. Before reaction, the reactor was further purged using 10 nitrogen pressurize/vent cycles (to 100 psi) and 2 ethylene pressurize/vent cycles (to 300 psi). The cycling served three purposes: (1) to thoroughly penetrate all dead ends such as pressure gauges to purge fugitive contaminants, (2) to displace nitrogen in the system with ethylene, and (3) to pressure test the reactor.

Catalyst preparation: All catalyst preparations were performed in an inert atmosphere with <1.5 ppm $H_2O$ content. In order to accurately measure small amounts of catalyst, often less than a milligram, freshly prepared catalyst stock solution/dilution methods were used in catalyst preparation. To maximize solubility of the metallocenes, toluene was used as a solvent. Stainless steel transfer tubes were washed with MAO to remove impurities, drained, and activator and catalyst were added by pipette, MAO first.

Macromer synthesis: First, the catalyst transfer tube was attached to a reactor port under a continuous flow of nitrogen to purge ambient air. Next, the reactor was purged and pressure tested as outlined above. Then, 600 ml of solvent was charged to the reactor and heated to the desired temperature. Comonomer (if any) was then added, temperature was allowed to equilibrate, and the base system pressure was recorded. The desired partial pressure of ethylene was added on top of the base system pressure. After allowing the ethylene to saturate the system (as indicated by zero ethylene flow), the catalyst was injected in a pulse using high pressure solvent. Reaction progression was monitored by reading ethylene uptake from the electronic mass flow meter. When the desired amount of macromer had accumulated, ethylene flow was terminated and reaction was terminated by rapid cooling (~1 minute) and addition of an excess of methanol to precipitate the polymer product. The polymer/solvent mixture was dried in flowing, ambient air.

Product characterization: The polymer product samples were analyzed by gel permeation chromatography using a Waters 150° C. high temperature system equipped with a DRI Detector, Showdex AT-806MS column and operating at a system temperature of 145° C. The solvent used was 1,2,4 trichlorobenzene, from which polymer sample solutions of 0.1 mg/ml concentration were prepared for injection. The total solvent flow rate was 1.0 ml/minute and the injection size was 300 microliters. GPC columns were calibrated using a series of narrow polystyrenes (obtained from Tosoh Corporation, Tokyo, 1989). For quality control, a broad-standard calibration based on the linear PE sample NBS-1475 was used. The standard was run with each 16-vial carousel. It was injected twice as the first sample of each batch. After elution of the polymer samples, the resulting chromatograms were analyzed using the Waters Expert Fuse program to calculate the molecular weight distribution and one or more of $M_n$, $M_w$ and $M_z$ averages. Quantification of long chain branching was performed the method of Randall, Rev. Macromo. Chem. Phys., C29, (2&3), p. 285–297. $^1$H-NMR analyses were performed using a 500 mHz Varian Unity model operating at 125° C. using $d_2$-tetrachloroethane as solvent. $^{13}$C-NMR analyses were performed using at 100 mHz frequency, a Varian Unity Plus model under the same conditions.

Example 1

Catalyst Preparation. A stainless steel catalyst addition tube was prepared as outlined above. An aliquot of 0.25 milliliters of 10% methylalumoxane (MAO) solution in toluene was added, followed by 0.5 milliliters of a toluene solution containing 1 milligrams of $Cp_2ZrCl_2$, biscyclopentadienyl zirconium dichloride, per milliliter. The sealed tube was removed from the glovebox and connected to a reactor port under a continuous flow of nitrogen. A flexible, stainless steel line from the reactor supply manifold was connected to the other end of the addition tube under a continuous flow of nitrogen.

Homopolymerization. The reactor was simultaneously purged of nitrogen and pressure tested using two ethylene fill/purge cycles (to 300 psig)(2170 kPa). Then, the reactor pressure was raised to ~40 psig (377 kPa) to maintain positive reactor pressure during setup operations. Jacket water temperature was set to 90° C. and 600 milliliters of toluene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 100 psig (791 kPa) and ethylene was added to the system until a steady state was achieved as measured by zero ethylene uptake. The reactor was isolated and a pulse of toluene pressurized to 300 psig (2170 kPa) was used to force the catalyst solution from the addition tube into the reactor. The 100 psig (791 kPa) ethylene supply manifold was immediately opened to the reactor in order to maintain a constant reactor pressure as ethylene was consumed by reaction. After 30 minutes of reaction, the reaction solution was quickly cooled and 200 milliliters of methanol were added to terminate reaction and precipitate polymer. Product was removed to an open 2 liter tub and dried in ambient air, yielding 38 grams of homopolyethylene. A summary of Example 1 reaction conditions is provided in Table 1.

Examples 2–7

Catalyst Preparation. The MAO-activated $Cp_2ZrCl_2$ catalysts of Examples 2–7 were identical to that of Example 1 except the amounts of catalyst solution (containing 1 milligram $Cp_2ZrCl_2$ per milliliter of toluene) and the amounts of 10% MAO in toluene solution used were different. These catalyst formulations are summarized in Table 1.

Homopolymerization. Reaction conditions used in Examples 2–7 involved only minor modifications of the conditions used in Example 1. These variations are summarized in Table 1.

Example 8.

Catalyst Preparation. Catalysts were prepared in a manner analogous to that of Example 1, differing only in the amounts of $Cp_2ZrCl_2$ and MAO activator used. These catalyst preparations are summarized in Table 1.

Copolymerization. The reactor was prepared as in Example 1 except nitrogen was used to fill the reactor before the addition of liquids. After the addition of toluene, 50 milliliters of butene were added and the reactor temperature was allowed to equilibrate at 90° C. A base pressure of 25 psig (273 kPa) was recorded. Ethylene was added to bring the total equilibrium system pressure to 125 psig (963 kPa), or alternatively stated, to produce an ethylene partial pressure of 100 psia (688 kPa). 10 minutes after catalyst injection, reaction was terminated by cooling and addition of methanol. 64 grams of ethylene/butene copolymer were isolated after drying.

Examples 9–10.

Catalyst Preparation. The amounts of $Cp_2ZrCl_2$ catalyst and MAO activator used in Examples 9–10 are summarized in Table 1. Addition tubes and catalyst solutions were prepared using the methods of Example 1.

Copolymerization. Following the methods of Example 8, nitrogen, solvent, and butene were added to the reactor and heated to 90° C. Base pressure was recorded and the ethylene pressure regulator was set to add ethylene so as to raise the equilibrium partial pressure of ethylene to 100 psia (689 kPa). After saturating the system with ethylene (as measured by zero ethylene uptake), the catalyst was injected. Reaction was terminated by methanol addition after the elapsed times of Table 1.

Example 11

Catalyst Preparation. An aliquot of 2.5 milliliters of 10% MAO in toluene was added to the stainless steel catalyst addition tube prepared as above. Next, 2 milliliters of a toluene solution containing 0.5 milligrams of $(C_5Me_4SiMe_2NC_{12}H_{23})TiCl_2$ (tetramethylcyclopentadienyl) dimethylsilyl (cyclododecamido) titanium dichloride, per milliliter was added to the addition tube.

Homopolymerization. Polymerization was performed using essentially the same procedures as Example 1, except using the conditions specified in Table 1. After drying, 17 grams of homopolymer were obtained.

Examples 12–15

Catalyst Preparation. Catalyst and activator were prepared using the procedures of Example 11. Only the amounts of catalyst solution and MAO activator were different (see Table 1).

Homopolymerization. The procedures used in Examples 12–15 were identical to those of Example 11, but with slightly different conditions summarized in Table 1.

Examples 16–19

Catalyst Preparation. Catalyst and activator were prepared using the methods of example 11. See Table 1 for amounts of activator and catalyst used.

Copolymerization. Solvent was added, followed by 1-butene, to a reactor filled with nitrogen. The reactor was heated to the desired reaction temperature (see Table 1) and the pressure was recorded. The ethylene supply regulator was adjusted to provide ethylene at a pressure necessary to maintain the tabulated absolute ethylene partial pressure. The ethylene supply was then opened to the reactor until equilibrium was reached. as indicated by zero ethylene flow. The reactor was sealed and catalyst was injected using high pressure solvent (toluene or hexane, depending on solvent used for reaction). After the indicated reaction times, the product was rapidly cooled, quenched using methanol, and dried in ambient air.

Examples 20–22

Catalyst Preparation. Toluene solutions containing 1 milligram of $((CH_3)_2Si(C_9H_6)_2)HfCl_2$, dimethylsilyl bis (indenyl) hafnium dichloride, per milliliter of solution were added to 10% MAO in toluene solutions for catalyst formulation. Amounts used are summarized in Table 1.

Copolymerization. Copolymerization reactions employed methods identical to those used in Examples 16–19 with the exception of example 21 in which hydrogen was added to the reactor. Hydrogen was supplied as follows: toluene and butene were added to a clean reactor containing nitrogen. The reactor was heated to 90° C. and the (base) pressure of 30 psig (308 kPa) was recorded. Hydrogen was added so as to raise the system pressure to 130 psig (998 kPa) (100 psia hydrogen partial pressure (689 kPa)). Next, the ethylene regulator was set to 230 psig (1687 kPa), so as to provide the system with a partial pressure of 100 psia (689 kPa) of ethylene. Thereafter. reaction was carried out in a manner analogous to Example 20.

Examples 23 & 24

Catalyst Preparation. Toluene solutions of $Cp_2ZrCl_2$ and $(C_5Me_4SiMe_2NC_{12}H_{23})TiCl_2$ described in Examples 1 and 11, respectively, were used. MAO (10% in toluene) was added first to the catalyst addition tube, followed by $(C_5Me_4SiMe_2NC_{12}H_{23})TiCl_2$ solution and subsequently by $Cp_2ZrCl_2$ solution.

Homopolymerization. Essentially the same procedures were used as in Example 1. Only conditions were different (Table 1).

Polymer Analyses, The molecular weight, comonomer content, and unsaturated-group structural distributions of the reaction products are reported in Table 2. Unsaturated-group concentrations (total olefins per 1000 carbon atoms) as well as vinyl group selectivities were found to increase with decreasing aluminum: metal ratios, all other factors being equal. Olefin concentrations (comonomer) can be increased further by decreasing the concentration of ethylene in solution (by decreasing ethylene partial pressure or increasing temperature).

TABLE 1

Reaction Condition Summary.

| Ex # | Catalyst* | Catalyst Amount (mg) | Ethylene Pressure (psi) | Reaction Temp. (° C.) | MAO** (ml) | Al/Metal ratio | Hexane (ml) | Toluene (ml) | 1-Butene (ml) | Hydrogen press. (psi) | Time (min) | Yield (g) |
|---|---|---|---|---|---|---|---|---|---|---|---|---|
| 1c | a | 0.5 | 100 | 90 | 0.25 | 172 | 0 | 600 | | | 30 | 38 |
| 2 | a | 4 | 100 | 90 | 0.25 | 21.5 | 0 | 600 | | | 30 | 34 |
| 3 | a | 8 | 100 | 90 | 0.5 | 21.5 | 0 | 600 | | | 18 | 58 |
| 4 | a | 32 | 20 | 90 | 2 | 21.5 | 0 | 600 | | | 30 | |
| 5c | a | 0.5 | 100 | 90 | 0.25 | 172 | 600 | 0 | | | 30 | 11 |
| 6 | a | 8 | 100 | 90 | 0.5 | 21.5 | 600 | 0 | | | 30 | 19 |
| 7 | a | 32 | 15 | 90 | 2 | 21.5 | 600 | 0 | | | 30 | 2 |
| 8c | a | 0.5 | 100 | 90 | 0.25 | 172 | 0 | 600 | 50 | | 10 | 64 |
| 9c | a | 1 | 100 | 90 | 0.5 | 172 | 600 | 0 | 50 | | 30 | |
| 10 | a | 32 | 100 | 90 | 2 | 21.5 | 600 | 0 | 50 | | 10 | 31 |
| 11c | b | 1 | 100 | 90 | 2.5 | 1375 | 0 | 600 | | | 30 | 17 |
| 12 | b | 8 | 20 | 90 | 0.5 | 34.4 | 0 | 600 | | | 5 | |
| 13c | b | 1 | 100 | 90 | 2.5 | 1375 | 600 | 0 | | | 30 | 12 |
| 14 | b | 32 | 17 | 90 | 2 | 34.4 | 600 | 0 | | | 30 | |
| 15c | b | 10 | 30 | 90 | 6 | 1375 | 600 | 0 | | | 20 | |
| 16c | b | 1 | 100 | 90 | 1.5 | 825 | 0 | 600 | 10 | | 30 | 15 |
| 17c | b | 1 | 100 | 90 | 1.5 | 825 | 0 | 600 | 50 | | 30 | 22 |
| 18 | b | 16 | 100 | 90 | 1 | 34.4 | 0 | 600 | 10 | | 30 | |
| 19c | b | 1 | 100 | 60 | 2.5 | 1375 | 600 | 0 | 50 | | 30 | 21 |
| 20c | c | 1 | 100 | 90 | 0.5 | 316 | 0 | 600 | 50 | | 30 | 6.5 |
| 21 | c | 5 | 130 | 90 | 1.25 | 158 | 0 | 600 | 50 | 100 | 30 | 36 |
| 22c | c | 1 | 100 | 90 | 0.5 | 316 | 600 | 0 | 50 | | 30 | 5 |
| 23 | a + b | 32 + 1.5 | 60 | 90 | 3 | 31.4 | 600 | 0 | | | 60 | 47 |
| 24c | a + b | 1 + 1 | 30 | 90 | 1 | 212 | 0 | 600 | | | 30 | |

*a = $Cp_2ZrCl_2$ b = $(C_5Me_4SiMe_2NC_{12}H_{23})TiCl_2$ c = $((CH_3)_2Si(C_9H_6)_2)HfCl_2$
**MAO = 10 wt. % methylalumoxane in toluene

TABLE 2

Summary of Polymer Analyses.

| Ex # | Mn | Mw | Mw/Mn | % Olefins as Vinyl | Vinyl per 1000 C | Vinylene per 1000 C | Vinylidene per 1000 C | Trisubsti-tuted per 1000 C | mole % butene | wt. % butene | LCB per 1000 C |
|---|---|---|---|---|---|---|---|---|---|---|---|
| 1c | 47184 | 101961 | 2.161 | 51.5 | 0.17 | 0.08 | 0.03 | 0.05 | | | |
| 2 | 25154 | 55516 | 2.207 | 91.4 | 0.32 | 0.03 | 0 | 0 | | | |
| 3 | 24619 | 54085 | 2.197 | 94.6 | 0.35 | 0.02 | 0 | 0 | | | |
| 4 | 5657 | 14916 | 2.637 | 88.4 | 2.05 | 0.15 | 0.12 | 0 | | | |
| 5c | 39544 | 102041 | 2.580 | 76.0 | 0.19 | 0.04 | 0.02 | 0 | | | |
| 6 | 12933 | 46941 | 3.630 | 89.5 | 0.77 | 0.09 | 0 | 0 | | | |
| 7 | 1744 | 4710 | 2.701 | 85.4 | 10.16 | 0.36 | 0.74 | 0.63 | | | |
| 8c | 10222 | 35513 | 3.474 | 18.5 | 0.17 | 0.08 | 0.02 | 0.65 | 4.4 | 8.5 | |
| 9c | 10315 | 33214 | 3.220 | 36.1 | 0.35 | 0.09 | 0.36 | 0.17 | 2 | 3.9 | |
| 10 | 6964 | 35992 | 5.168 | 64.3 | — | 0.06 | 0.07 | 1.51 | 3.9 | 7.5 | |
| 11c | 110000 | 332087 | 3.019 | | | | | | | | |
| 12 | 22124 | 125359 | 5.666 | 89.6 | 0.43 | 0.03 | 0.02 | 0 | | | |
| 13c | 99900 | 288000 | 2.883 | | | | | | | | |
| 14 | 3655 | 13117 | 3.589 | 86.1 | 2.48 | 0.12 | 0.11 | 0.17 | | | |
| 15c | 14087 | 37966 | 2.695 | 64.3 | 0.36 | 0.10 | 0.05 | 0.05 | | | 0.21 |
| 16c | 57187 | 134710 | 2.356 | 63.2 | 0.12 | 0.02 | 0.05 | 0 | | | |
| 17c | 62704 | 153163 | 2.443 | 14.3 | 0.03 | 0.07 | 0.01 | 0.1 | 35.9 | 52.8 | |
| 18 | 48611 | 173905 | 3.577 | 84.6 | 0.22 | 0 | 0 | 0.04 | 5.8 | 10.9 | |
| 19c | 190105 | 402985 | 2.120 | 5.9 | 0.01 | 0.02 | 0 | 0.14 | 31.7 | 48.1 | |
| 20c | 81835 | 211882 | 2.589 | 6.7 | 0.02 | 0.09 | 0.05 | 0.14 | 16.8 | 28.7 | |
| 21 | 7014 | 23431 | 3.341 | 56.3 | 0.09 | 0.02 | 0.04 | 0.01 | 12.5 | 22.2 | |
| 22c | 63906 | 148475 | 2.323 | 14.6 | 0.06 | 0.11 | 0.06 | 0.18 | 16.1 | 27.7 | |
| 23 | 4396 | 17467 | 3.973 | 90.0 | 2.71 | 0.12 | 0.18 | 0 | | | |
| 24c | 27359 | 56997 | 2.083 | 59.3 | 0.32 | 0.16 | 0.03 | 0 | | | |

The following examples illustrate preparation of macromers according to the invention and copolymerization of them with copolymerizable monomers to form long-chain branched copolymers.

Example I

Catalyst Preparation. A stainless steel catalyst addition tube was prepared as outlined above. An aliquot of 1 milliliter of 10% methylalumoxane (MAO) solution in toluene was added, followed by 16 mg of $Cp_2ZrCl_2$ in toluene solution. The sealed tube was removed from the glovebox and connected to a reactor port under a continuous flow of nitrogen. A flexible, stainless steel line from the reactor supply manifold was connected to the other end of the addition tube under a continuous flow of nitrogen.

Macromer Synthesis. The 1-liter reactor was simultaneously purged of nitrogen and pressure tested using two ethylene fill/purge cycles (to 300 psig (2170 kPa)). Then, the reactor pressure was raised to ~20 psig (239 kPa) to maintain positive reactor pressure during setup operations. Jacket water temperature was set to 90° C. and 600 milliliters of toluene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 20 psig and ethylene was added to the system until a steady state was achieved as measured by zero ethylene uptake. The reactor was isolated and a pulse of toluene pressurized to 300 psig (2170 kPa) was used to force the catalyst solution from the addition tube into the reactor. The 20 psig (239 kPa) ethylene supply manifold was immediately opened to the reactor in order to maintain a constant reactor pressure as ethylene was consumed by reaction. After 8 minutes of reaction, the reaction solution was quickly heated to 150° C. for 30 minutes to kill the catalyst, then cooled to 90° C. A small macromer sample was removed via an addition port. Analysis by $^{13}$C-NMR indicated no measurable long chain branches were present in the macromer. The number and weight average molecular weights of the macromer were 9,268 and 23,587 Daltons, respectively, with 81.7% of olefins as vinyls.

Example II

Branched Polymer Preparation. 25 grams of an 80.7% norbornene in toluene solution were added to the contents of the reactor of Example I immediately after the macromer sampling. A catalyst addition tube containing 0.5 ml 10% MAO in toluene solution and 1 mg $CpCp^*ZrCl_2$ was connected to the addition port. The total pressure in the 90° C. reactor was raised to 100 psig (791 kPa) by adjusting the ethylene supply regulator and allowing the system to reach equilibrium, as indicated by zero ethylene flow into the reactor. The catalyst was injected using a pulse of toluene at 300 psig (2170 kPa). After 20 minutes of reaction time, the system was quickly vented and cooled. The sample was quenched using an excess of methanol and evaporated to dryness. 42 grams of ethylene-norbornene copolymer product containing branched polymers with homopolyethylene branches and ethylene-norbornene backbone were isolated. $^{13}$C NMR analysis of the product indicated 0.085 long chain branches per 1000 carbon atoms were present.

Example III

Catalyst Preparation. A stainless steel catalyst addition tube was prepared as outlined above. An aliquot of 2 milliliter of 10% methylalumoxane (MAO) solution in toluene was added, followed by 32 mg of $(C_5Me_4SiMe_2NC_{12}H_{23})TiCl_2$ in toluene solution. The sealed tube was removed from the glovebox and connected to a reactor port under a continuous flow of nitrogen. A flexible, stainless steel line from the reactor supply manifold was connected to the other end of the addition tube under a continuous flow of nitrogen.

Macromer Synthesis. The 2-liter reactor was simultaneously purged of nitrogen and pressure tested using two ethylene fill/purge cycles (to 300 psig) (2170 kPa). Then, the reactor pressure was raised to about 40 psig (377 kPa) to maintain positive reactor pressure during setup operations. Jacket water temperature was set to 90° C. and 1200 milliliters of toluene and 20 ml of butene were added to the reactor. The stirrer was set to 750 rpm. Additional ethylene was added to maintain a positive reactor gauge pressure as gas phase ethylene was absorbed into solution. The reactor temperature controller was set to 90° C. and the system was allowed to reach steady state. The ethylene pressure regulator was next set to 40 psig (377 kPa) and ethylene was added to the system until a steady state was achieved as measured by zero ethylene uptake. The reactor was isolated and a pulse of toluene pressurized to 300 psig was used to force the catalyst solution from the addition tube into the reactor. The 40 psig (377 kPa) ethylene supply manifold was immediately opened to the reactor in order to maintain a constant reactor pressure as ethylene was consumed by reaction. After 25 minutes of reaction, the reaction solution was quickly heated to 147° C. for 15 minutes to kill the catalyst, then cooled to 90° C. The system was continuously vented and purged with nitrogen to dryness so as to remove both solvent and the ethylene and butene monomers. Then, 1,200 ml of toluene were added and the system equilibrated at 90° C. A sample of the ethylene-butene macromer was removed for analysis via the addition port. Number and weight average molecular weights of the macromer were 22,394 and 58,119 respectively. The comonomer content of the macromer as obtained by FTIR measurements was 6.6 mole % butene.

Example IV

Branched Polymer Preparation. The contents of the reactor of Example III (at 90° C.) were pressurized to 100 psig by adjusting the ethylene supply regulator and allowing the system to reach equilibrium, as indicated by zero ethylene flow into the reactor. A catalyst addition tube containing 2 ml of 10% MAO in toluene solution and 2 mg of $(C_5Me_4SiMe_2NC_{12}H_{23})TiCl_2$ in toluene solution was connected to the addition port. The catalyst was injected using a pulse of toluene at 300 psi. After 10 minutes of reaction time, the system pressure was raised to 300 psig (2170 kPa). After 23 minutes of reaction time, the system was quickly vented and cooled. The sample was quenched using an excess of methanol and evaporated to dryness. 69.5 grams of product were isolated and analyzed by FTIR as homopolyethylene backbones having 56% by weight branches of the ethylene-butene macromer of Example III.

The chain branching was measured by separating the high molecular weight branched material from the low molecular weight macromer using GPC methods and then quantifying by FTIR the amount of the butene in both the macromer and the high molecular weight branched polymer. Thus the average butene content in the branched, high molecular weight material was 3.7 mole %, as opposed to that of the macromer product at 6.6 mole % butene. The branching level was calculated from the following equation:

$$\text{wt \% branches} = \frac{\text{\% butene in the high MW fraction}}{\text{\% butene in the macromer fraction}} \times 100\%.$$

TABLE 3

Reaction Condition Summary.

| Ref. # | Catalyst | Catalyst Amount (mg) | Ethylene Partial Pressure (psi) | Reaction Temp. (° C.) | MAO** (ml) | Al/Metal ratio | Toluene (ml) | 1-Butene (ml) | Norbornene (80.7% in toluene) | Time (min) | Yield (g) |
|---|---|---|---|---|---|---|---|---|---|---|---|
| I | a | 16 | 20 | 90 | 1 | 34.4 | 600 | — | — | 8 | — |
| II | b | 1 | 100 | 90 | 0.5 | 275 | 600 | — | 25 g | 20 | 42 |
| III | c | 32 | 40 | 90 | 2 | 34.4 | 1200 | 20 | — | 25 | — |
| IV | d | 2 | 100/300 | 90 | 2 | 550 | 1200 | — | — | 23 | 69.5 |

*a = $Cp_2ZrCl_2$; b = $Cp((Me_5)Cp)ZrCl_2$; c = $(C_5Me_4SiMe_2NC_{12}H_{23})TiCl_2$
**MAO = 10 wt. % methylalumoxane in toluene

I claim:
1. A composition of matter comprising:
(a) vinyl ended olefin copolymer chains having a number average molecular weight ($M_n$) of about 1500 to 25,154, the number average molecular weight being determined by gel permeation chromatography (GPC) at 145° C.;
(b) a ratio of vinyl groups to total olefin groups according to the formula:

(vinyl groups/olefin groups)≧(comonomer mole percentage+0.1)$^a$× 10$^a$×b    (1)

where a and b have the following sets of values:
(i) when a=−0.24, b=0.8;
(ii) when a=−0.20, b=0.8;
(iii) when a=−0.18, b=0.83;
(iv) when a=−0.15, b=0.83; or
(v) when a=−0.10; b=0.085;
wherein
the total number of vinyl groups per 1000 carbon atoms is greater than or equal to 8000÷$M_n$;
wherein the number of vinyl groups is determined by $^1$H-NMR at 125° C.; and
wherein $M_w/M_n$ ranges from 2.083 to 5.666.
2. The composition of claim 1 where a=−0.24 and b=0.8.
3. The composition of claim 1 where a=−0.20 and b=0.8.
4. The composition of claim 1 where a=−0.18 and b=0.83.
5. The composition of claim 1 where a=−0.15 and b=0.83.
6. The composition of claim 1 where a=−0.10 and b=0.85.
7. The composition of claim 1 wherein the vinyl ended olefin copolymer chains are prepared from monomers selected from at least one of ethylene, $C_3$ to $C_{12}$ α-olefins, isobutylene or norbornene.
8. The composition of claim 1 wherein the vinyl groups are greater than 80% of the total unsaturated groups.
9. The composition of claim 1 wherein the number average molecular weight ($M_n$) ranges from about 1500 to 10,000.

10. The composition of claim 9 wherein the number average molecular weight ($M_n$) ranges from about 2,000 to 5,000.

11. A composition of matter comprising:
(a) vinyl ended olefin copolymer chains having a number average molecular weight ($M_n$) of about 1500 to 75,000, the number average molecular weight being determined by gel permeation chromatography (GPC) at 145° C.;
(b) a ratio of vinyl groups to total olefin groups according to the formula:

$$\text{(vinyl groups/olefin groups)} \geq \text{(comonomer mole percentage} + 0.1)^a \times 10^a \times b \quad (1)$$

where a and b have the following sets of values:
(i) when a=−0.24, b=0.8;
(ii) when a=−0.20, b=0.8;
(iii) when a=−0.18, b=0.83;
(iv) when a=−0.15, b=0.83; or
(v) when a=−0.10, b=0.85;
wherein
the total number of vinyl groups per 1000 carbon atoms is greater than or equal to $8000 \div M_n$;
wherein the number of vinyl groups is determined by $^1$H-NMR at 125° C.;
wherein $M_w/M_n$ ranges from 2.083 to 5.666; and
wherein the vinyl ended olefin copolymer chains are prepared from ethylene and at least one monomer selected from $C_3$ to $C_{12}$ α-olefins.

12. The composition of claim 11 where a=−0.24 and b=0.8.

13. The composition of claim 11 where a=−0.20 and b=0.8.

14. The composition of claim 11 where a=−0.18 and b=0.83.

15. The composition of claim 11 where a=−0.15 and b=0.83.

16. The composition of claim 11 where a=−0.10 and b=0.85.

17. The composition of claim 11 wherein the number average molecular weight ($M_n$) ranges from about 1500 to 10,000.

18. The composition of claim 17 wherein the number average molecular weight ($M_n$) ranges from about 2,000 to 5,000.

* * * * *